(12) United States Patent
McCollom et al.

(10) Patent No.: US 6,343,274 B1
(45) Date of Patent: *Jan. 29, 2002

(54) APPARATUS AND METHOD FOR MERCHANT-TO-CONSUMER ADVERTISEMENT COMMUNICATION SYSTEM

(75) Inventors: William Girard McCollom, Fort Collins; Robert King Ables, Drake; Jacqueline Ann Bray, Fort Collins; Carolyn Soberalske Cotten, Hotchkiss; Martin Robert Fink, Fort Collins; Shane Douglas Meyer, Windsor; Silvi Kiisk Steigerwald, Fort Collins, all of CO (US)

(73) Assignee: Hewlett-Packard, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,498

(22) Filed: Sep. 11, 1998

(51) Int. Cl.[7] .............................................. G06F 17/60
(52) U.S. Cl. ........................................... 705/26; 705/14
(58) Field of Search .............................. 705/26, 10, 65, 705/14; 709/217, 21; 380/24, 25

(56) References Cited

U.S. PATENT DOCUMENTS

| 5,710,884 | A | * | 1/1998 | Dedrick | 709/217 |
| 5,724,521 | A | * | 3/1998 | Dedrick | 705/26 |
| 5,732,400 | A | * | 3/1998 | Mandler et al. | 705/26 |
| 5,828,837 | A | | 10/1998 | Eikeland | 395/200.32 |
| 5,850,442 | A | * | 12/1998 | Muftic | 705/65 |
| 5,889,863 | A | * | 3/1999 | Weber | 380/25 |
| 5,933,811 | A | * | 8/1999 | Angles et al. | 705/14 |
| 5,948,061 | A | * | 9/1999 | Merriman et al. | 709/219 |
| 5,950,173 | A | * | 9/1999 | Perkowski | 705/26 |
| 5,974,396 | A | * | 10/1999 | Anderson et al. | 705/10 |
| 5,987,132 | A | * | 11/1999 | Rowney | 380/24 |
| 5,999,912 | A | * | 12/1999 | Wodarz et al. | 705/14 |
| 6,006,197 | A | * | 12/1999 | D'Eon et al. | 705/10 |
| 6,009,410 | A | * | 12/1999 | LeMole et al. | 705/14 |
| 6,026,369 | A | * | 2/2000 | Capek | 705/14 |

FOREIGN PATENT DOCUMENTS

WO     WO 00/05684    *   2/2000

OTHER PUBLICATIONS

Campbell, Lisa "Net Worth: Internet Advertising." Marketing (May 28, 1998) pp. 1–6.*

Mosley–Matchett, J.D. "'Eveball' the validity of Internet ad measures." Marketing news (May 12, 1997) vol. 31, No. 10, pp. 1–3.*

* cited by examiner

*Primary Examiner*—Eric W. Stamber
*Assistant Examiner*—John Leonard Young

(57) ABSTRACT

An apparatus and method provide privacy for the consumer identity and protects information concerning advertisements accessed by the consumer while still providing marketing and demographic statistics to the merchant regarding those advertisement accesses. A consumer user interface provides the consumer easy control over what advertisements the consumer is receiving and allows the consumer to easily subscribe and unsubscribe from advertisements from either particular merchants or categories of products and services. A commerce server receives the request for services from the consumer user interface program and provides the requested advertisements from specific merchants or from selected categories.

29 Claims, 11 Drawing Sheets

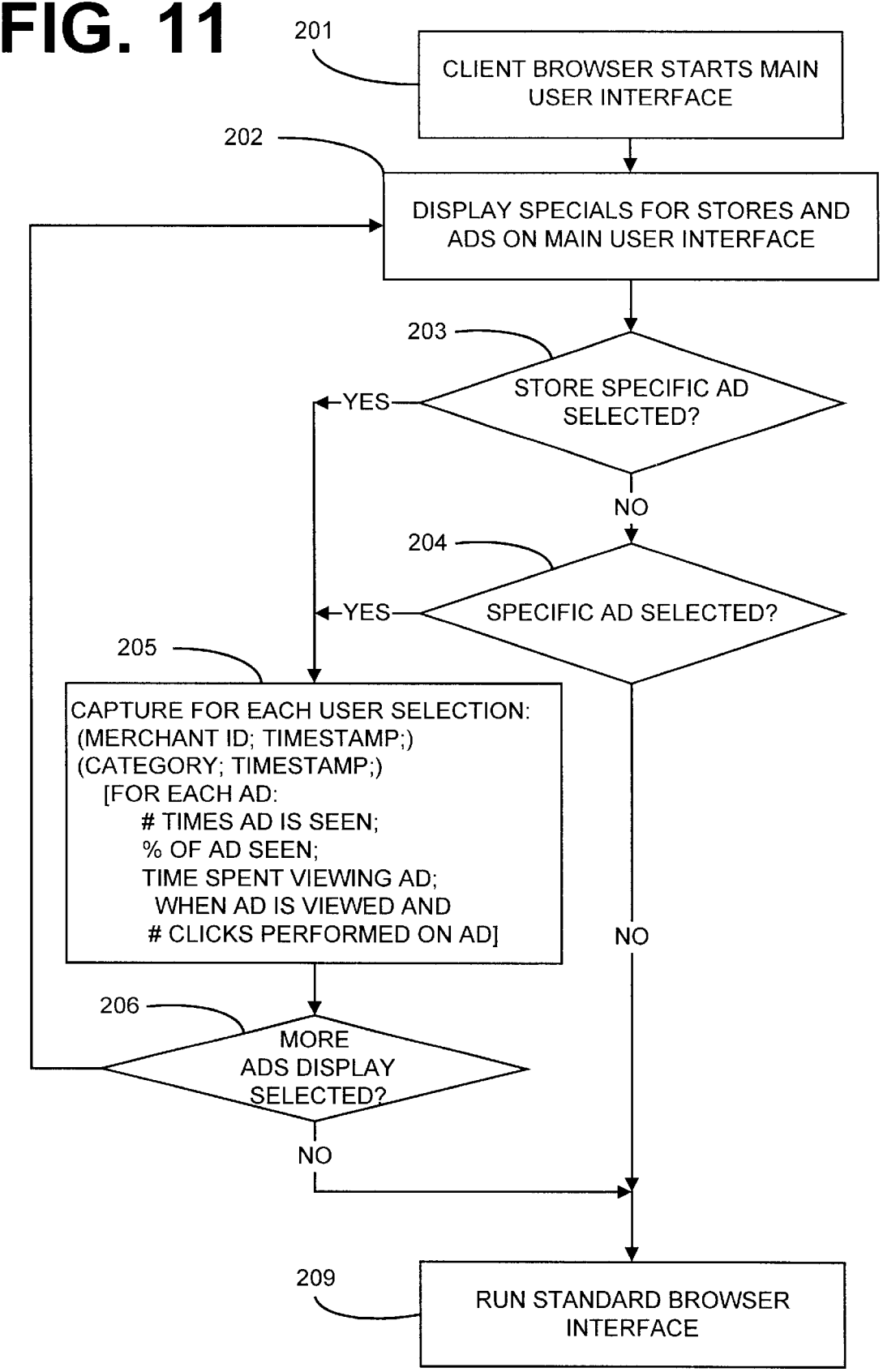

APPARATUS AND METHOD FOR MERCHANT-TO-CONSUMER ADVERTISEMENT COMMUNICATION SYSTEM

BACKGROUND OF THE INVENTION

1. Field of the Invention

The present invention generally relates to computers and software, and more particularly, to providing merchant advertisements to consumers utilizing a network.

2. Description of Related Art

As known in the art, the Internet is a world-wide collection of networks and gateways that use the Transmission Control Protocol/Internet Protocol suite of protocols to communicate with one another. At the heart of the Internet is a backbone of high speed data communication lines between major nodes or host computers consisting of thousands of commercial, government, educational, and other computer systems that route data and messages.

World Wide Web (WWW) refers to the total set of interlinked hypertext documents residing on hypertext transfer protocol (HTTP) servers all around the world. Documents on the WWW, called pages or web pages, are written in hypertext mark-up language (HTML) identified by uniform resource locators (URL) that specify the particular machine and pathname by which a file can be accessed and transmitted from node to node to the end user under HTTP. A web site is a related group of these documents and associated files, scripts, subprocedures, and databases that are served up by an HTTP server on the WWW.

Users need a browser program and an Internet connection to access a web site. Browser programs, also called "web browsers," are consumer applications that enable a user to navigate the Internet and view HTML documents on the WWW, another network, or the user's computer. Web browsers also allow users to follow codes called "tags" embedded in an HTML document, which associate particular words and images in the document with URLs so that a user can access another file that may be half way around the world, at the press of a key or the click of a mouse.

One type of document that consumers access are merchant advertisements. The recent rapid growth of information applications on the international public packet switch computer network such as the Internet suggest that the public computer networks have the potential to establish a new kind of open marketplace for goods and services. As web pages are used internationally, it is highly desirable for manufacturers and merchants to be able to advertise their goods and services to as many potential customers as possible. Currently, on the Internet the primary way to advertise is through the use of advertisement banners which consist of trademarks, text, buttons or images comprised of hyperlinks, which transport a user to a particular website to access information regarding goods and services.

Unfortunately, as the Internet provides public access to advertisements on a merchants server, this access can allow the merchant to collect information that the consumer may wish to keep private. Until now, network systems have lacked the ability to provide merchant advertisements to consumers and still preserve the privacy of the consumer while providing statistical demographic information to the merchant.

SUMMARY OF THE INVENTION

Certain objects, advantages, and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an apparatus and method for providing privacy of consumer identity and protected information concerning advertisements accessed by the consumer, while still providing marketing and demographic statistics to the merchant regarding the consumer advertisement accesses. The guiding principal of the present invention is to preserve the privacy of the user/consumer. Any data that is shared between the user consumer and the merchant or commerce server must respect the privacy of the consumer. No private or personal information about the consumer is shared with the merchant. While the commerce server keeps demographic statistics, there is no private or personal information that can be traced back to an individual consumer. Thus while preserving consumer privacy, the consumer-to-merchant advertisement communication system still collects and provides information to the merchant regarding the access of merchant advertisements that the merchant could not obtain through simple web advertising. This marketing information provides a unique value to merchants who subscribe to the merchant communication system of the present invention.

In accordance with one embodiment of the present invention, a consumer user interface browser program allows a consumer to interact with a consumer-to-merchant advertisement communication system. A consumer user program provides the consumer with a desirable alternative to unsolicited e-mail messages and banner advertisements. The consumer user interface program also allows the consumer to determine when the consumer wishes to view particular merchant advertisements. The consumer user interface program provides the consumer easy control over what advertisements the consumer is receiving and allows the consumer to easily subscribe and unsubscribe from advertisements from either particular merchants or categories of products and services.

The commerce server application receives the request for services from the consumer user interface program and provides the requested advertisements from specific merchants or from selected categories. The consumer user interface program allows the consumer to redefine which merchant advertisements or category advertisements each individual consumer wishes to receive. During the connection with the consumer user browser program the commerce server not only provides the above-identified advertisements, but collects statistics with regard to previously provided merchant and category advertisements that have been accessed by the consumer.

In accordance with another embodiment of the present invention, the commerce server also provides for interaction with the merchant allowing the merchant to sign up and register, as well as to purchase advertisement slots for specific merchant or category advertisements, and associated key words with those advertisements.

In accordance with another embodiment of the present invention, the commerce server also provides merchants with the ability to publish advertisements, get reports based upon the statistics collected from the consumer user interface program, and to edit the merchant's profile on the commerce server.

In accordance with another embodiment of the present invention, the merchant is provided with a means to publish advertisements on the commerce server via the world wide web and to establish an interface for customers to access the merchant customer support.

In accordance with yet another embodiment of the present invention, the commerce server provides a centrally managed site for merchant advertisement information that is accessible worldwide by consumers.

In accordance with yet another embodiment of the present invention, the commerce server keeps current advertisement information available so that consumers can access the commerce server and retrieve only the latest advertisements from particular merchants or in particular categories.

In yet another embodiment of the present invention, the consumer user interface program supports the ability of the consumer to search for merchant advertisement or category advertisement based on key words and store names.

In accordance with another embodiment of the present invention, the commerce server also provides the ability to track consumer advertisement statistics across the entire consumer base.

In accordance with another embodiment of the present invention, the consumer user browser program allows the consumer to register with particular merchant's advertisements listed by category.

In accordance with yet another embodiment, the consumer user browser program allows the consumer to search merchant advertisements or category advertisements by key word categories and stores.

In accordance with yet another embodiment of the present invention, the consumer user interface browser program allows for the user to preselect favorite merchants or categories in which to receive advertisements.

In accordance with yet another embodiment of the present invention, the consumer user interface browser program allows the consumer to decide what type of advertisements to automatically retrieve.

In accordance with yet another embodiment of the present invention, the consumer user interface browser program allows the consumer to subscribe to a particular merchant for advertisements.

In accordance with yet another embodiment of the present invention, the consumer user interface browser program provides the consumer the ability to filter advertisements based upon category and merchant.

In accordance with another embodiment of the present invention, the consumer user interface browser program captures statistics on advertisement effectiveness on the consumer and provides the statistics to the merchant while still protecting the privacy of each particular consumer.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 11 is a flow diagram for the operation of the main user interface for the consumer user browser program process of the present invention, as shown in FIG. 2.

DETAILED DESCRIPTION OF THE PREFERRED EMBODIMENT

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
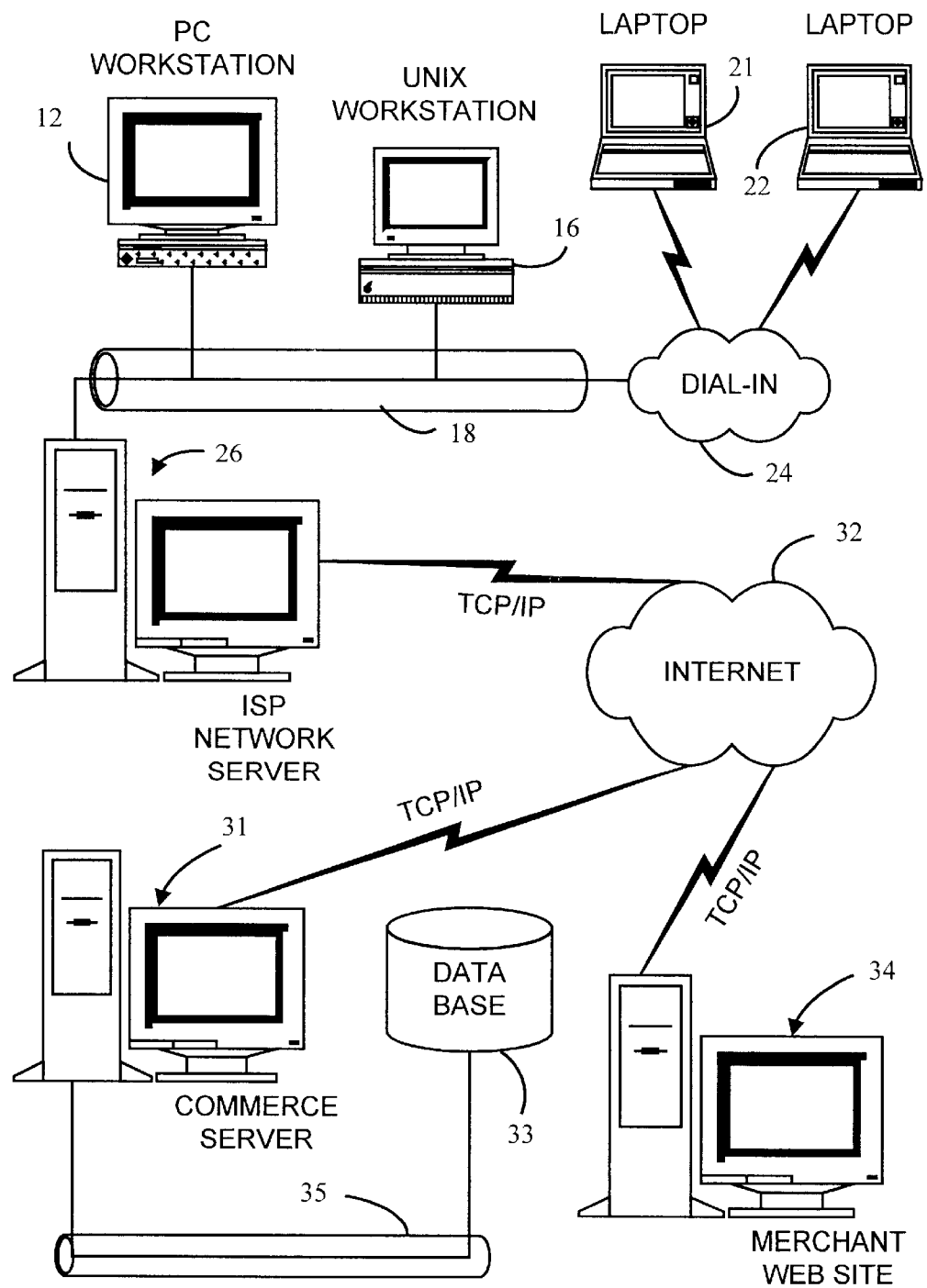
FIG. 1 is a block diagram of the consumer/server system utilizing the Internet.

Turning now to the drawings, FIG. 1 is a block diagram of just one system configuration that illustrates the flexibility, expandability, and platform independence of the present invention. While the system configuration could take many forms, the diagram of FIG. 1 illustrates a plurality of diverse consumer workstations 12 and 16, directly connected to a network, for example, but not limited to, a local area network (LAN) 18. Additional workstations 21, 22 may similarly be remotely located and in communication with the network 18 through a dial-in or other connection 24. Each of the workstations in FIG. 1 are uniquely illustrated to emphasize that workstations may comprise a diverse hardware platform.

As is well known, browser applications are provided and readily available for a variety of hardware platforms. Browsers are most commonly recognized for their utility for accessing information over the Internet 32. As aforementioned, a browser is a device or platform that allows a user to view a variety of service collections. The browser retrieves information from a commerce server 31 or network server 26 using HTTP, then interprets HTML code, formats, and displays the interpreted result on a workstation display.

Additional servers 31 and 34 provide for access to web pages on the Internet. Web commerce server 31 and database 33 communicate on a LAN network 35. Network 35 may be, for example, Ethernet type networks, also known as 10 BASE 2, 10 BASE 5, 10 BSAF, 10 BASE T, BASE BAN network, COAX cable, and the like. Merchant server 34 provides access to specific merchant web pages that included but are not limited to advertisements including specific merchandise information, ordering data, inventory data, shipping data and customer support access.

Figure 2:
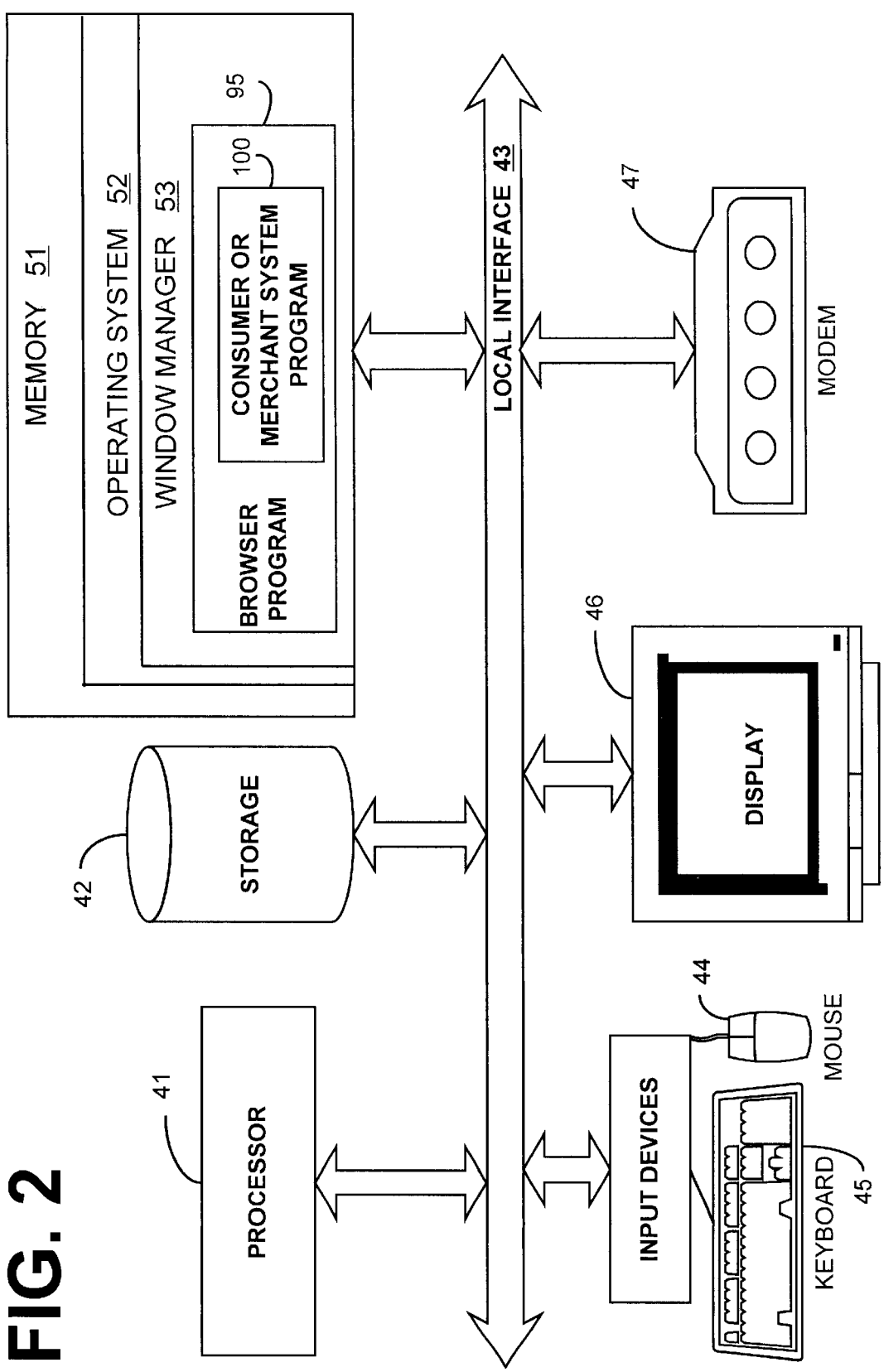
FIG. 2 is a block diagram illustrating a browser program situated within a computer readable medium, e.g., in a computer system of the consumer systems.

As illustrated in FIG. 2 consumer systems today generally include a browser program 95 (e.g., Netscape Navigator, Internet Explorer, or other browser program) for use in accessing locations on a network. These browser programs 95 reside in computer memory 51 and access communication facilities modem network card 47 to transport the user access to other resources connected to the network. In order to find a resource, the user should know the network location of the resource denoted by a network location identifier or URL. These identifiers are often cryptic, following very complex schemes and formats in their naming conventions.

Systems today identify, access, and process these resources desired by a user by using the processor 41, storage device 42, and memory 51 with an operating system 52 and window manager 53. The processor 41 accepts data from memory 51 and storage 42 over the local interface 43. Direction from the user can be signaled by using input devices mouse 44 and keyboard 45. The actions input and result output are displayed on the display terminal 46.

The first embodiment of the present invention involves the browser consumer program 100. The browser consumer program 100 is the software that interacts with the commerce and merchant servers to obtain the requested advertisement data and functionality requested by the consumer. The consumer program 100 will be described hereafter in detail with regard to FIGS. 4 and 5.

Figure 3:
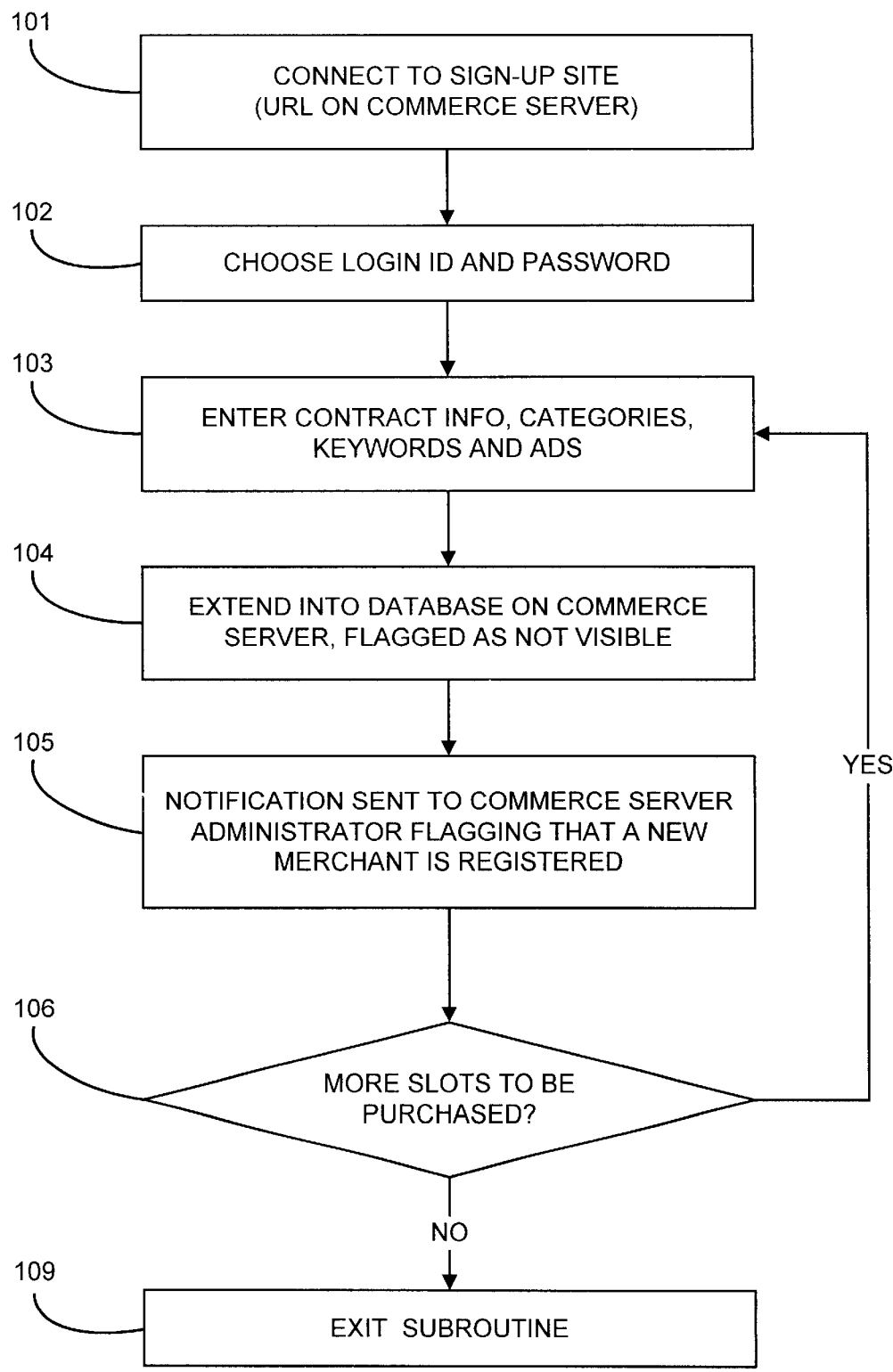
FIG. 3 is a flow diagram of the merchant sign-up and slot purchase process for the merchant server application of the present invention, as shown in FIGS. 1 and 2.

Illustrated in FIG. 3 is the flow diagram of the merchant sign-up and slot purchase process for the merchant server 34 application 100 of the present invention. The merchant connects to the commerce server 31 to sign up at step 101. The merchant accomplishes this by utilizing the URL on the commerce server 31. The merchant then chooses a logon ID password and inputs this data into the commerce server 31. This logon ID password information is written to a file within database 33.

The merchant next enters the required contractual information, categories for the desired advertisement to be included in, and key words for identifying the merchant advertisement in the advertisement itself at step 103. The commerce server 31 writes the contract information, categories for the included advertisement, key words to search the included advertisement and the merchant advertisement itself into database 33 at step 104. Next, the commerce server 31 generates and sends a notification to the commerce server administrator indicating that a new merchant has been registered at step 105.

Then, the merchant is queried if the merchant wishes to purchase more advertisement slots at step 106. If the merchant wishes to purchase additional advertising slots, the process returns to step 103 to repeat the above steps 103 through 105. If the merchant declines to purchase additional slots at this time, the process then exits at step 109.

Figure 4:
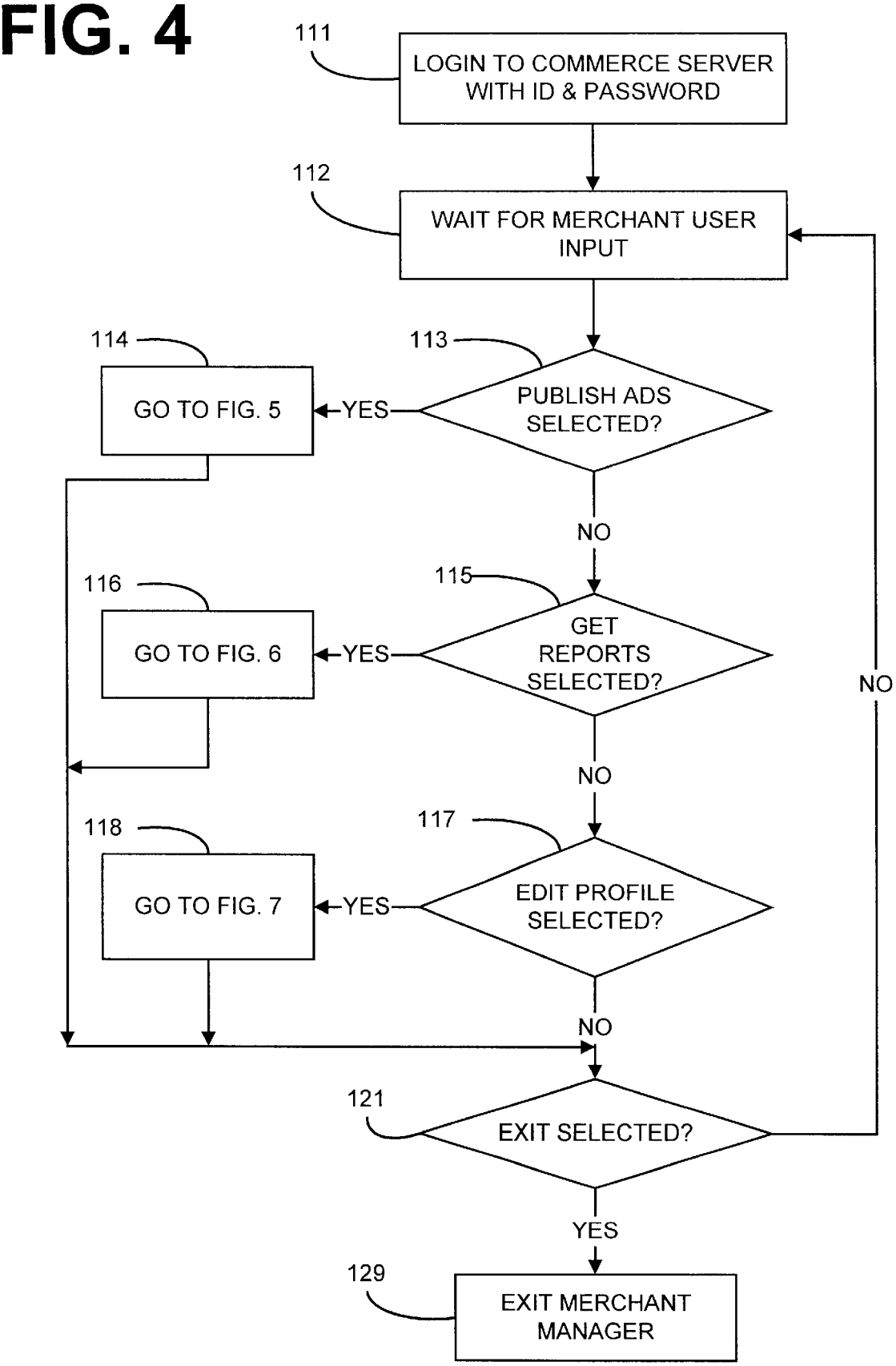
FIG. 4 is a flow diagram of the ongoing operation process for the commerce server with the merchant server website of the present invention, as shown in FIG. 1.

Illustrated in FIG. 4 is the flow diagram of the ongoing operation process for the commerce server 31 application with the merchant server website 34 of the present invention. The merchant logs into the commerce server 31 with the ID and password established in FIG. 3, step 102, at step 111. The commerce server 31 waits for the merchant user to input a request for data at step 112.

The data input is then tested to see if the merchant requests an advertisement to be published at step 113. If an advertisement is to be published, the process goes to step 114 to execute the published advertisement routine herein further defined with regard to FIG. 5. After the commerce server 31 has published the advertisement at step 114, the commerce server 31 then proceeds to step 121. If the merchant has not selected to publish an advertisement, the commerce server 31 then checks if the merchant has selected a report at step 115.

Figure 6:
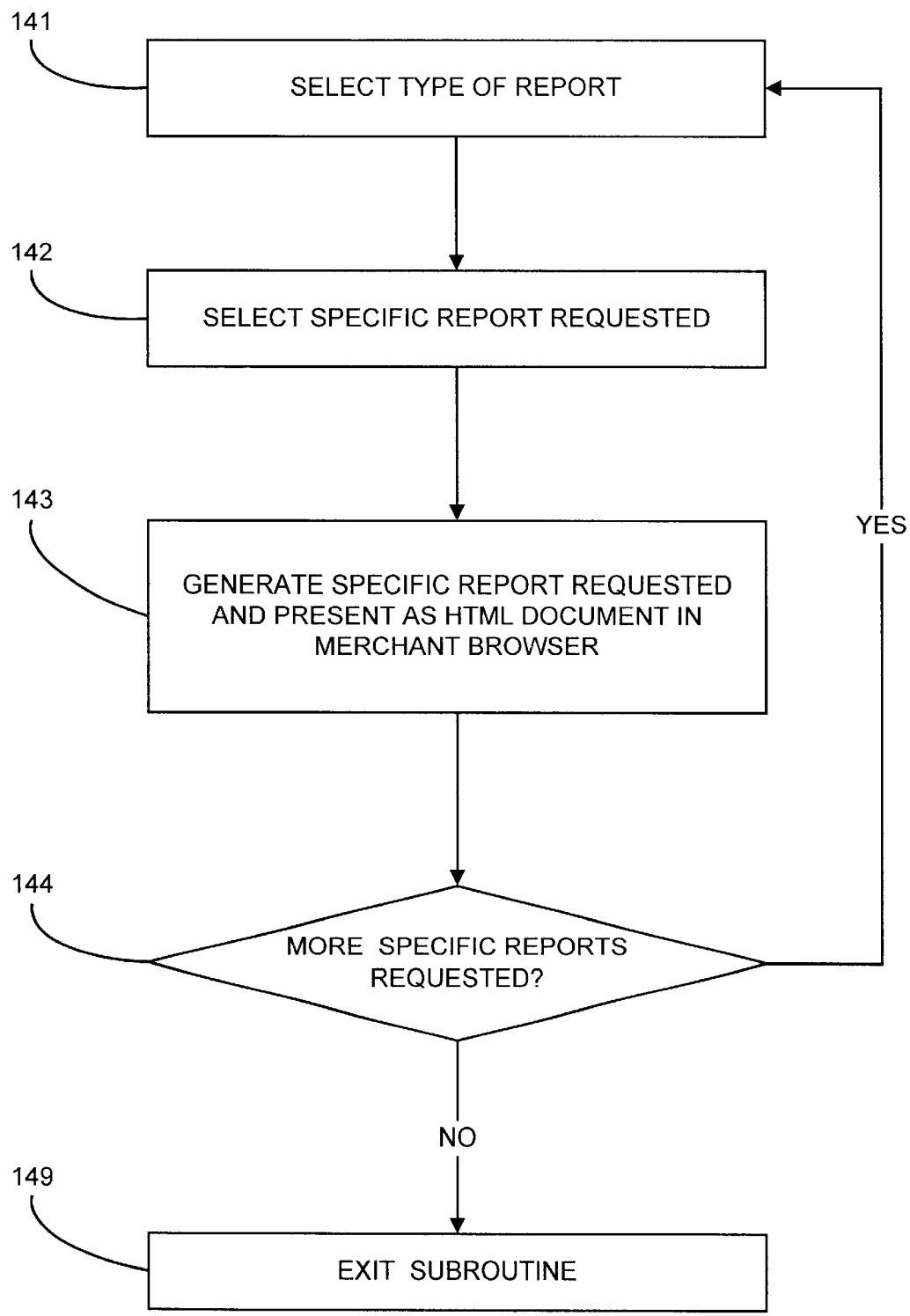
FIG. 6 is a flow diagram of the report generation process for the consumer server of the present invention, as shown in FIG. 4.

If a report has been selected at step 115, the commerce server 31 then proceeds to step 116 to obtain the desired report which is herein defined in further detail with regard to FIG. 6. After retrieving the desired report at step 116, the commerce server then proceeds to step 121. If a report is not requested at step 115, the commerce server 31 then checks if the merchant has indicated that a profile edit is to be performed at step 117.

Figure 7:
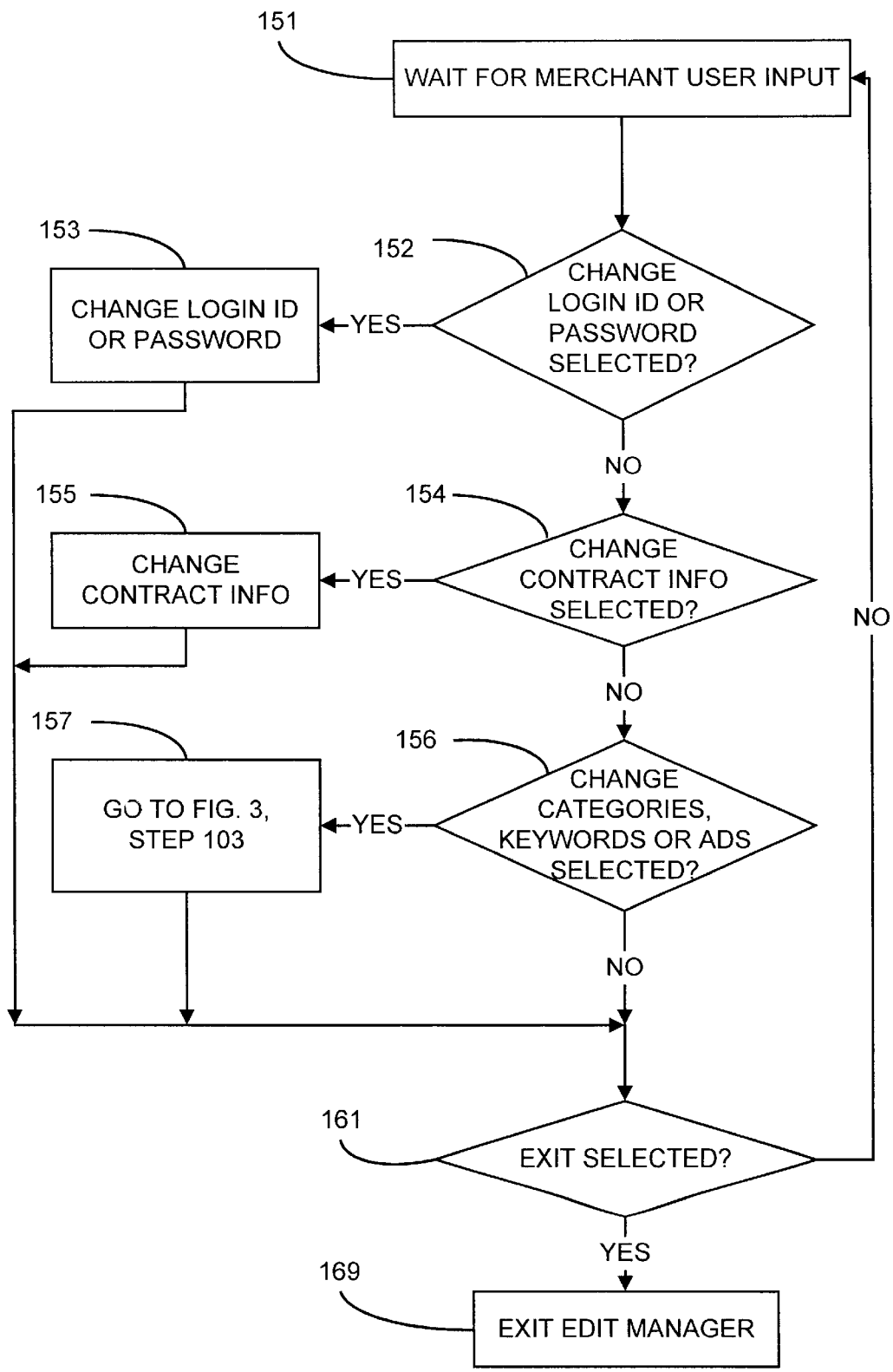
FIG. 7 is a flow diagram of the edit profile process for the commerce server of the present invention, as shown in FIG. 4.

If a profile edit is to be performed, the commerce server 31 then proceeds to step 118 to process the edit profile procedure desired by the merchant which is herein further defined with regard to FIG. 7. After performing the desired profile edit at step 118, the commerce server then proceeds to step 121. If at step 117 the merchant has not selected to edit the profile, the commerce server then checks if exit of the normal operating procedure is requested at step 121.

If the exit is not selected at step 121, the commerce server then returns to step 112 for further processing. If an exit has been selected at step 121, the commerce server 31 then exits the merchant manager program at step 129.

Figure 5:
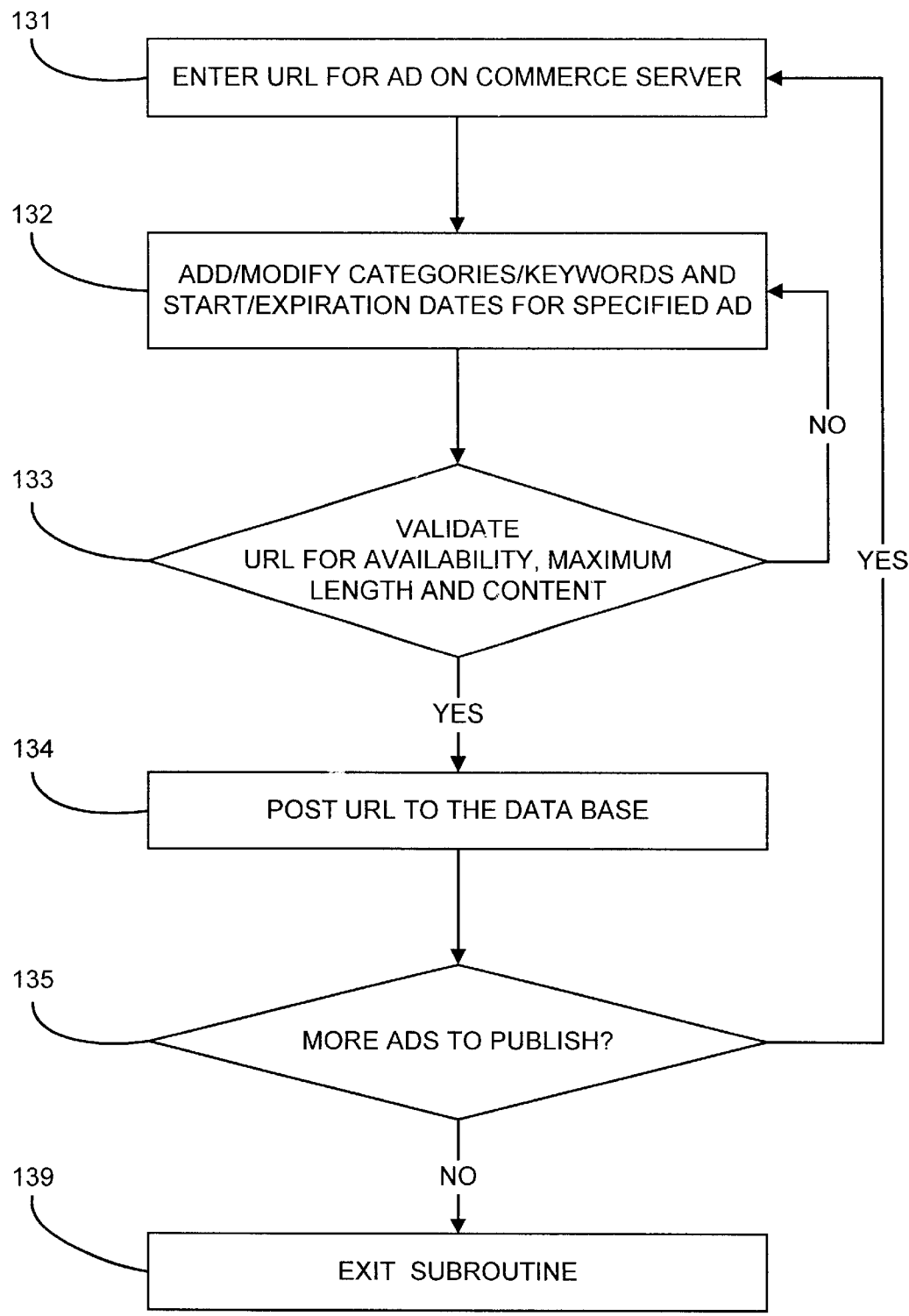
FIG. 5 is a flow diagram of the advertisement publishing process for the consumer server of the present invention, as shown in FIG. 4.

Illustrated in FIG. 5 is the flow diagram of the advertisement publishing process for the commerce server 31 application of the present invention. The advertisement publication routine requests the URL for a particular advertisement on the commerce server 31 from the merchant at step 131. The commerce server 31 then checks the categories and/or key words and the start and expiration dates for the specified advertisement to be published at step 132.

The commerce server 31 then validates the URL for availability, maximum length and acceptable content at step 133. If the validation fails for availability, maximum length, acceptable content or other tests of the like, the commerce server 31 returns to step 132 to further modify the advertisement. If the commerce server 31 validates the advertisement at step 133, then the commerce server 31 posts the advertisement URL to the database 33 at step 134. The commerce server 31 tests if the merchant desires to publish more advertisements at step 135. If the merchant wishes to publish more advertisements, the process returns to step 131 for continued processing. If the merchant has chosen not to publish more advertisements at step 135, the commerce server exits the publication routine at step 139.

Illustrated in FIG. 6 is the flow diagram of the report generation process for the consumer server application of the present invention. The commerce server 31 first allows the merchant to select a type of report for generation at step 141. The commerce server 31 then requests the merchant to select a specific type of report requested at step 142. The commerce server 31 next generates a specific report requested and presents the report as a HTML document to the merchant website 34 merchant browser at step 143. In an alternative embodiment, these documents can be generated in other types of desired formats.

The reports can include but are not limited to the following information: Total number of impressions; Average number of impressions per client; Average time spent viewing an ad (i.e. impression duration); Graph of number of times ad seen vs. time of day; Average percentage of ad seen (e.g. on average, clients saw 92% of the ad); Total number of click-throughs (user clicks on ad URLs); Number of customers where the merchant is a favorite; Share of favorites slot—number of customers listing merchant as a favorite vs. total customers that have favorites (including breaking this down by category as well, e.g. of customers who list shoe stores in their favorites, a specific merchant is listed 71.3% of the time); Ad share—Of all ads a customer has viewed, how many have been from this merchant; Time share—Of all ads, favorites, banners, etc., how much time have customers spent on average "viewing" the merchant; What share of ad clicks does the merchant get (number clicks to the merchant vs. clicks to other merchants); Distribution of the host domains used to access the merchant via the consumer registry (e.g. 75% from the .com domain, 10% from the .edu domain, etc.); Average connection speed of consumers connecting to the merchant registry and which visit the merchant; Breakdown of customer's screen resolution & screen depth; Distribution of client default browser settings.

The commerce server 31 then checks if the merchant has requested more specific reports at step 144 and if more reports are requested returns to step 141 for further processing. If no more specific reports are requested at step 144, the report publication subroutine is exited at step 149 and returns to step 121 in FIG. 4.

Illustrated in FIG. 7 is flow diagram of the edit profile process for the commerce server 31 application of the present invention, referenced in FIG. 4 at step 118. The commerce server 31 waits for the merchant to input edit profile information at step 151. The commerce server 31 checks to see if the merchant requests a change of the login ID or password at step 152. If a change to the login ID or password is selected at step 152, the commerce server 31 then changes the login ID or password at step 153 and proceeds to step 161. If a change to login ID or password is not selected at step 152, the commerce server 31 checks if a change to contract information is selected at step 154.

If a change to the contract information is selected, the commerce server 31 performs the requested contract information change at step 155 and proceeds to step 161. If a change to the contract information is not selected at step 154, the commerce server 31 then determines if the merchant requires a change to the category's key words or an advertisement at step 156. If a change to the category's key words or advertisement is selected at step 156, commerce server 31 then returns to perform the change to the advertisement requested at step 157. The change to the category's key word or advertisement information is performed at FIG. 3, steps 103–109.

After completing a change to the category's key words or advertisement information at step 157, the commerce server then proceeds to step 161. If a change to the category's key words or advertisement information is not selected at step 156 by the merchant, the commerce server then checks if the merchant has indicated exit from the profile editing function at step 161. If exit of the profile edit routine is not requested at step 161, the commerce server 31 then returns to step 151 for further profile editing. If exit is selected at step 161, the commerce server 31 then exits via edit manager at step 169 and returns to step 121 in FIG. 4 for continued processing.

Figure 8:
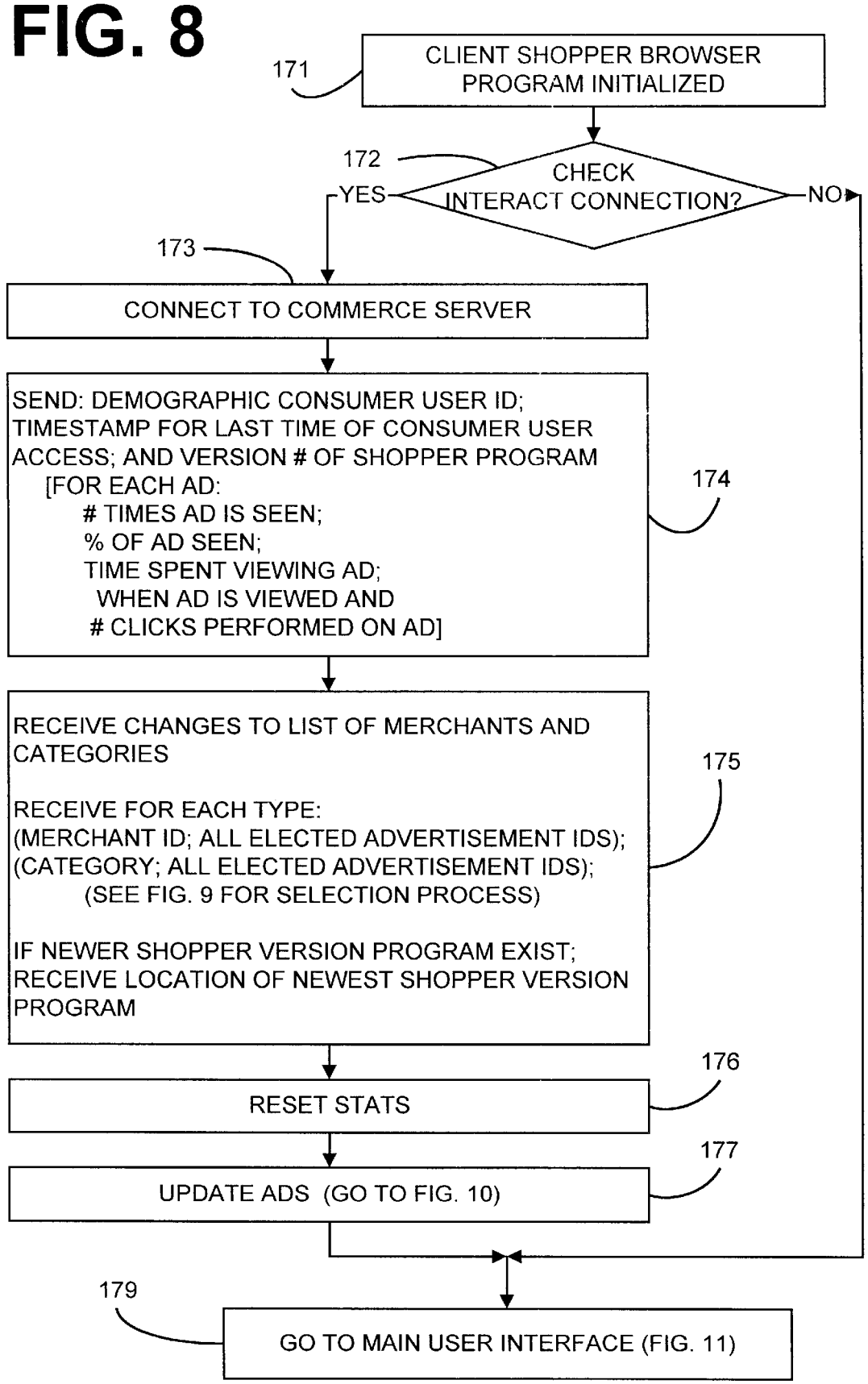
FIG. 8 is a flow diagram of the consumer application process for the consumer user browser process of the present invention, as shown in FIGS. 1 and 2.

Illustrated in FIG. 8 is the flow diagram of the consumer program 100 for the consumer user browser 95 of the present invention. The consumer 95 is initialized by the user at step 171. The consumer or merchant system program 100 checks if the consumer requests a commerce server 31 interact connection at step 172. If the consumer has not requested interaction with commerce server 31 at step 172, the consumer browser program then proceeds to step 179 to continue processing with the main user interface in FIG. 11.

If the consumer does request interaction with the commerce server 31 at step 172, the consumer program then connects to the commerce server 31 at step 173. Once the connection is established with the commerce server 31, the consumer program 100 then sends the demographic ID# for the consumer, the time stamp for the last time the consumer data was downloaded, and the version number of the program used by the consumer. The consumer program 100 also sends for each merchant ID advertisement and each category advertisement, the statistical information for each advertisement the consumer has viewed. The statistical information captured about each advertisement viewed by the consumer includes, but is not limited to: the number of times each advertisement for each merchant in each category is seen; the percentage of the advertisement viewed; the total amount of time spent viewing the advertisement; what time periods of the day the advertisement is viewed; and the number of times the user has clicked on the advertisement to obtain further information from the merchant website 34. The consumer program will continue to send this type of information for each merchant ID and category ID, for each advertisement with captured statistical information.

Once the consumer program 100 has sent all the statistical information captured from the consumer interaction, the consumer program 100 requests and receives from the commerce server 31, all advertisements from each merchant and in each category that the user has preselected at step 175. This process on the commerce server 31 is herein defined in detail with regard to FIG. 9.

The consumer program 100 also receives from the commerce server 31, any changes or updates to the list of merchants or categories. Also at step 175, the consumer program 100 detects from the commerce server 31 if a newer consumer program version exists. If a new consumer program version exists, the commerce server 31 transmits the location of the newest consumer program version at step 175.

Once the consumer program has received all the new advertisements regarding each merchant and each category selected at step 175, the consumer program then resets all the statistical information captured with regard to all elected advertisements at step 176. The consumer program then updates the advertisements on the main user interface at step 177. The update of the main user interface is herein defined in further detail with regard to FIG. 10.

After the consumer program has interacted with the commerce server 31 and sent all statistical information and received all new advertisements, the consumer program then goes to the main user interface for continued processing at step 179. The main user interface is herein defined in further detail with regard to FIG. 11.

Figure 9:
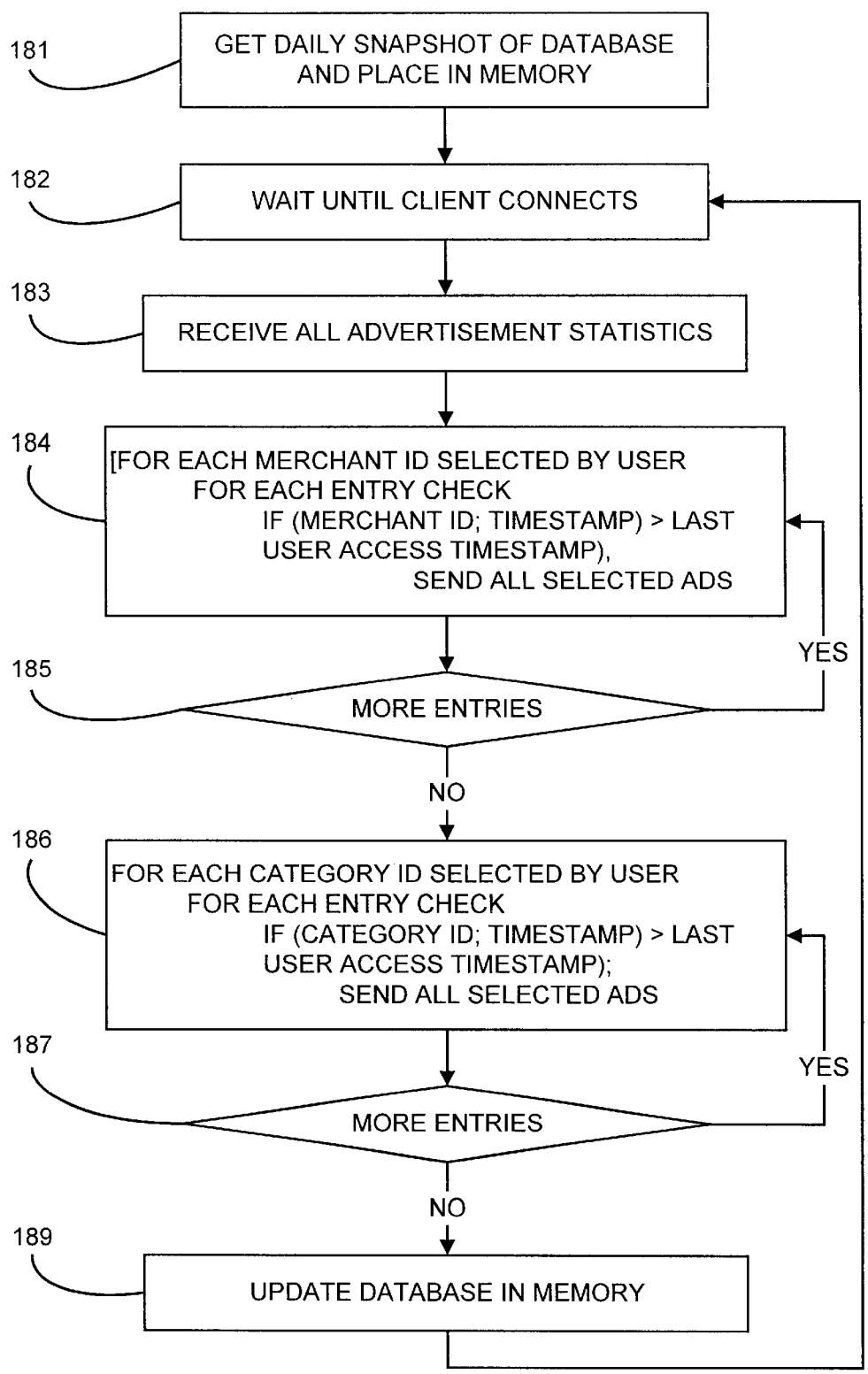
FIG. 9 is a flow diagram of the statistical information capture process for the commerce server of the present invention, as referenced in FIG. 8.

Illustrated in FIG. 9 is the flow diagram of the statistical information capture process performed by the commerce server 31 of the present invention. Once the consumer program 100 has established a connection with the commerce server 31 at step 173 in FIG. 8, the commerce server 31 receives the statistical information for each advertisement viewed by the consumer with regard to each merchant ID and category ID previously selected. As defined previously, the statistical information acquired by the consumer program includes, but is not limited to, the number of times each advertisement is viewed, the percentage of the advertisement viewed by the consumer, the total time spent viewing each advertisement, at what time of day each advertisement is viewed and the number of times the consumer has requested further information with regard to an advertisement by clicking on the advertisement.

The commerce server 31, upon connection with the consumer program 100 at step 173 in FIG. 8, acquires a daily snapshot of the advertisement database 33 and places the advertisement database 33 in memory at step 181. The commerce server 31 then waits for a consumer program 100 to establish a connection at step 182. This connection is defined for the consumer program 100 at step 173.

The commerce server 31, upon establishing a connection with the consumer program 100 receives all advertisement statistics at step 183. These statistics were previously defined with regard to step 174 in FIG. 8.

At step 184, the commerce server 31 checks all of the advertisements viewed by the consumer for each merchant ID preselected by the consumer. For ea ch merchant ID preselected, the commerce server 31 determines if the current merchant ID advertisement time stamp is newer than the last merchant ID advertisement accessed by the consumer. If so, the commerce server 31 transmits, to the consumer, all new merchant advertisements that are newer than the one last accessed by the consumer. The commerce server 31 then checks if there are more merchant ID entries to be processed at step 185 and returns to step 184 if there are more entries to be processed.

If there are no more category ID entry advertisements, the commerce server 31 then checks all of the advertisements viewed by the consumer for each category ID preselected by the consumer at step 186. For each category ID preselected, the commerce server 31 determines if the current category ID advertisement time stamp is newer than the last category ID advertisement accessed by the consumer. If so, the commerce server 31 transmits, to the consumer, all new category advertisements that are newer than the one last accessed by the consumer. The commerce server 31 then checks if there are more category ID entries to be processed at step 187 and returns to step 186 if there are more entries to be processed.

If there are no more category ID advertisements at step 187, the commerce server 31 then updates the advertisement database in memory at step 189 and then loops to step 182 to wait for the next consumer to connect to the commerce server 31.

Figure 10:
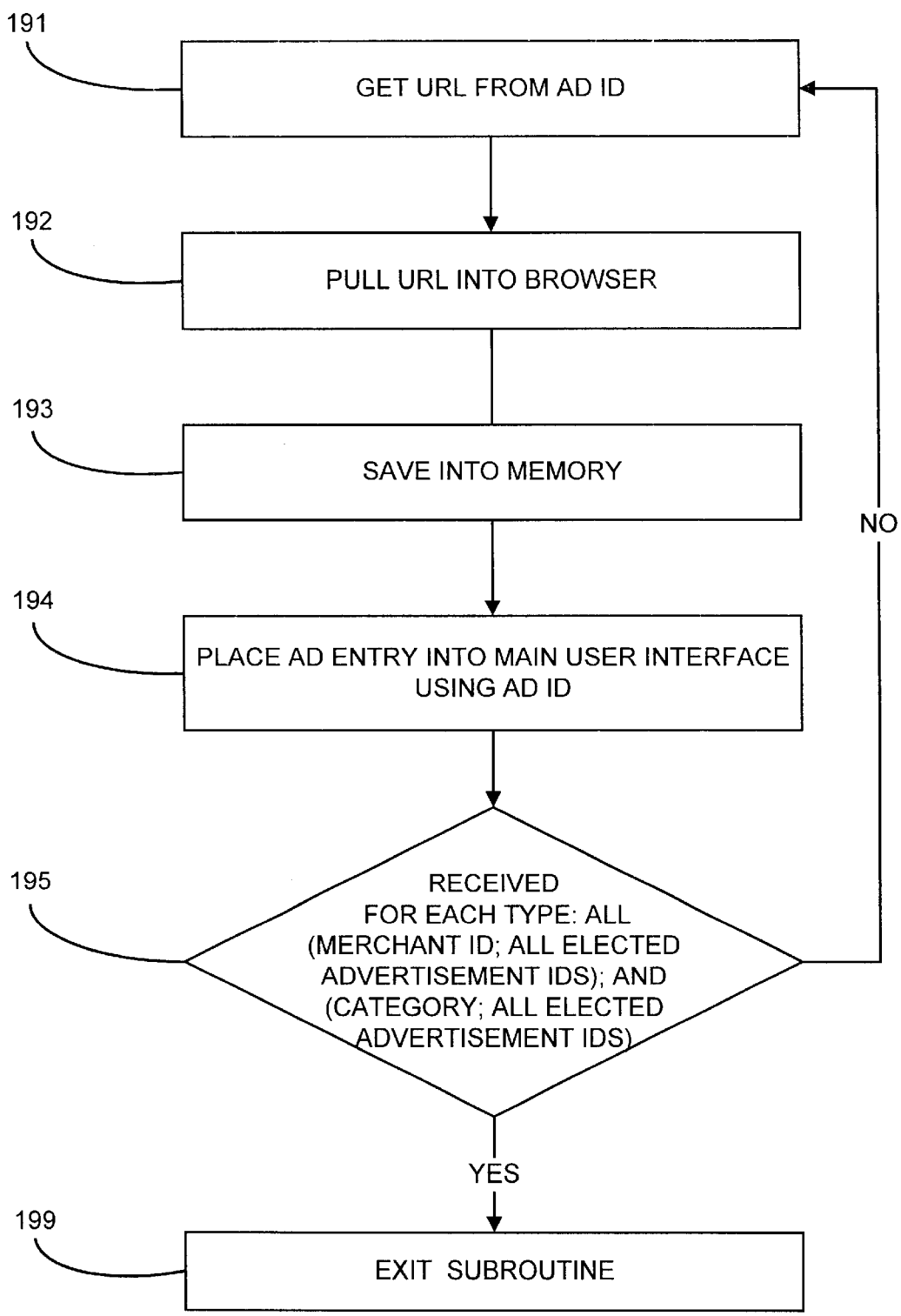
FIG. 10 is a flow diagram of the advertisement download process for the consumer user browser program process of the present invention, as shown in FIG. 2.

Illustrated with regard to FIG. 10 is the flow diagram of the advertisement download process for the consumer user browser program 100 of the present invention, previously referenced herein at step 177 in FIG. 8. The update advertisement process residing in the consumer program 100 acquires the URL from the advertisement ID at step 191. The consumer program 100 pulls the URL, using a background thread or process, into the browser 95 at step 192. The consumer program 100 saves the URL into memory at step 193. In applications where the consumer browser 95 is an Internet Explorer, there is a temporary Internet file folder defined for these type of documents. However, it is well known in the art that there are numerous ways to provide memory storage accessed by a browser program.

The consumer program 100 next places the advertisement entry into the main user interface utilizing the advertisement ID at step 194. The consumer program 100 next checks if there are more ads to be received for all preselected merchant IDs and category IDs at step 195. If not all elected advertisement IDs have been received at step 195, the consumer program returns to step 191 to receive the next URL from the commerce server 31. If all advertisement IDs have been received for all the elected merchant IDs and category IDs selected by the consumer at step 195, then the update advertisement routine is terminated at step 199.

Illustrated in FIG. 11 is the a flow diagram for the operation of the main user interface referenced with regard to step 179 in FIG. 8. The consumer program 100 starts the main user interface operation at step 201. The main user interface displays either all the consumer preselected specials (i.e., list of advertisement) for either merchant stores or category advertisements, list of merchant store advertisements or list of ideas (i.e., a favorites list) on the main user interface menu at step 202.

The list of ideas is an easy, flexible way for the consumer to maintain shopping lists, wish lists, etc. The list of ideas is a tabbed dialogue of lists the consumer wishes to maintain. Initially, only a new list "tab" will exist. When this is selected, either by clicking or adding an item, a rename dialogue will pop up asking the consumer for the desired name of this list. A new tab with this name will be created and the new list tab will shift to the right. With the exception of a new list tab "tab," the tabs will be sorted in alphabetical order. If more tabs are created than can fit on the screen, arrows will appear on the left with a "<" or on the right with a ">" as needed to allow shifting to tabs not visible. The tabs will always be within one row, i.e., they should not be stacked. The list of ideas helps the consumer to become comfortable with the idea of retaining items in preparation for future action. The list of ideas also provides for the use of a list as a local "gift registry" with the ability to e-mail the list to others.

A list will contain the following items:
1. A check box to indicate whether or not an item has been purchased. This serves as a way to keep a log within the user/browser area.
2. Notes, including the consumer's own brief note regarding this item. This field is intended to allow flexibility for recording items as seen in the physical store.
3. Location, wherein the preferred embodiment utilizes a URL where the item was found. It may also be possible to include other non-URL location information here, in case of an item being available at a local physical store.
4. The cost of the item will also be included in the list.
5. Notes for any additional information that the consumer wants to retain is also included. It is possible to drag and drop web pages into this second notes attachment field. The notes attachment should also support clip board cut and paste.

The list of ideas is an icon on a browser bar that brings a consumer to the ideas area with no filtering. The first time to the ideas area, the left list tab will be active, i.e., positioned in front. On subsequent visits to this list of ideas, the last list used will be displayed and active.

Moving through the list to a merchant site is done in the following ways: first, by clicking on a tab that brings a list forward. As mentioned earlier, if a tab is a new list, the process of creating a new list will automatically be initiated. Another way to move through the list of ideas is by clicking on a list item that selects another item. A third way to move through the list is by clicking on the location field which jumps to a merchant page. In the preferred embodiment, a URL is used to jump to a merchant page thereby replacing the current area with the merchant page. Another method of navigating through the list of ideas is by clicking on the notes icon that pops up with the notes dialog. If a note does not exist, it is created when clicked upon. The list of ideas also includes the ability to click on a find button to bring a find dialog up for consumer interaction. The lists can then be searched by store name, catalog description, key words or text description. If there are multiple matches on a given search, the first item found is highlighted (with the list moved forward, if necessary). Utilizing the find button again can then be selected via a right click on a mouse button to jump to the next matched item. If no items match a consumer search, a dialog box is displayed indicating this situation.

The user also has the ability to print a list of ideas. This feature allows for a list to be sent to a printer or saved to a text or other possible formats file. The list could then be sent via e-mail or other means to another person as a gift wish list. This allows the list to act as a local gift registry as noted previously on numerous different functions that can be utilized for a wish list of ideas. The wish list may allow searching as previously defined, adding an item to a list, or adding a last item to the list to display the last item added. The list of ideas may be deleted in its entirety or just a specific item within a list may be deleted. An entire list may be renamed or an item may be renamed. The cut and paste feature is also supported for an entire list or an individual item.

The main user interface next checks if the consumer has selected a specific merchant advertisement for display at step 203. If the consumer has not selected a specific merchant for display at step 203, then the main user interface checks if the user has selected a specific advertisement at step 204. If the consumer has selected either a specific merchant advertisement or specific advertisement to be displayed in steps 203 or 204, the main user interface captures the statistical information with regard to each merchant advertisement or category advertisement viewed by the consumer at step 205. After the consumer browser has captured the statistical information for the specific advertisement selected in steps 203 and 204, the browser next inquires if there are more advertisement displays to be selected at step 206. If the consumer indicates that more advertisements are to be displayed, the process then returns to step 202 to allow the consumer to select the next desired merchant or specific advertisement. If the consumer has indicated that no more advertisements are being selected, or if no advertisements were selected in steps 203 and 204, the consumer browser then proceeds to step 209 to run the standard browser interface.

The consumer-to-merchant advertisement communication system comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for providing privacy for consumer information while accessing merchant advertisement resources in a network system, the method comprising the steps of:

collecting consumer nonprivate statistical advertisement data for advertisements accessed by a consumer using a consumer user interface;

transmitting the consumer nonprivate statistical advertisement data to a commerce server;

receiving automatically new consumer preselected specific types of advertisements for display to the consumer on the consumer user interface; and providing anonymous nonprivate statistical advertisement data to a merchant.

2. The method of claim 1, further including the step of:

determining when the consumer user interface is to automatically receive the consumer preselected specific types of advertisements.

3. The method of claim 1, further including the step of:

determining which of the consumer preselected specific types of advertisements are automatically received.

4. The method of claim 1, wherein the step of providing nonprivate statistical advertisement data to the merchant further includes the step of:

getting reports based upon the consumer nonprivate statistical advertisement data collected across the entire consumer base.

5. The method of claim 1, further including the step of:

receiving only the advertisements not previously received.

6. The method of claim 1, further including the step of:

establishing an interface for the customers to access merchant customer support.

7. The method of claim 1, further including the step of:

searching for particular advertisements based on key words.

8. The method of claim 1, further including the steps of:

registering the consumer for particular merchant advertisements listed by category from a plurality of merchants; and selecting by the consumer the consumer preselected specific types of advertisements to be received from a second plurality of merchants.

9. The method of claim 1, further including the steps of:
providing for merchant interaction with the commerce server to enable the merchant to sign up and register;
providing for merchant interaction with the commerce server to enable the merchant to edit a merchant's profile on the commerce server; and
providing for merchant interaction with the commerce server to enable the merchant to purchase advertisement slots for specific category advertisements and associated key words.

10. A computer system for providing privacy for consumer information while accessing merchant advertisement resources in a network system, comprising:
means for collecting consumer nonprivate statistical advertisement data for advertisements accessed by a consumer using a consumer user interface;
means for transmitting the consumer nonprivate statistical advertisement data to a commerce server;
means for receiving automatically new consumer preselected specific types of advertisements for display to the consumer on the consumer user interface; and
means for providing anonymous nonprivate statistical advertisement data to a merchant.

11. The computer system apparatus of claim 10, further comprising:
means for enabling the consumer to determine when the consumer user interface is to automatically receive the new consumer preselected specific types of advertisements.

12. The computer system apparatus of claim 10, further comprising:
means for enabling the consumer to determine which specific types of advertisements are automatically received.

13. The computer system apparatus of claim 10, wherein the means for providing nonprivate statistical advertisement data to the merchant further comprises:
means for enabling the merchants to get reports based upon the anonymous nonprivate statistical advertisement data collected across an entire consumer base.

14. The computer system apparatus of claim 10, further comprising:
means for enabling the consumers to receive only the advertisements not previously received.

15. The computer system apparatus of claim 10, further comprising:
means for establishing an interface for the customers to access merchant customer support.

16. The computer system apparatus of claim 10, further comprising:
means for enabling the consumer to search for particular advertisements based on key words.

17. The computer system apparatus of claim 10, further comprising:
means for allowing the consumer to register for particular merchant advertisements listed by category from a plurality of merchants; and
means for allowing the consumer to select the preselected specific types of advertisements to be received from a second plurality of merchants.

18. The computer system apparatus of claim 10, further comprising:
means for providing for merchant interaction with the commerce server allowing the merchant to sign up and register;
means for enabling the merchant to edit a merchant profile on the commerce server; and
means for providing for interaction with the merchant allowing the merchant to purchase advertisement slots for specific category advertisements and associated key words.

19. A computer system for providing privacy for consumer information collected while accessing merchant advertisement resources in a network system, comprising:
a client device that collects consumer nonprivate statistical advertisement data for advertisements accessed by a consumer, transmits the consumer nonprivate statistical advertisement data, and receives automatically new consumer preselected specific types of advertisements for display to the consumer on the client device; and
a commerce server device for receiving consumer nonprivate statistical advertisement data, and providing reports to a merchant based upon the consumer nonprivate statistical advertisement data collected across an entire consumer base.

20. The client device of claim 19, further comprising:
a first client mechanism that enables the consumer to determine when the client device is to automatically receive the consumer preselected specific types of advertisements.

21. The client device of claim 19, further comprising:
a second client mechanism that enables the consumer to determine which of the consumer preselected specific types of advertisements are automatically received.

22. The client device of claim 19, further comprising:
a third client mechanism that enables the client device to receive only the advertisements not previously received.

23. The client device of claim 19, further comprising:
a fourth client mechanism that enables the consumer to search for particular advertisements based on key words.

24. The client device of claim 19, further comprising:
a fifth client mechanism that enables the consumer to select the consumer preselected specific types of advertisements to be received from a plurality of merchants.

25. The commerce server device of claim 19, further comprising:
a second commerce server mechanism that enables merchant interaction with the commerce server device, enables the merchant to sign up and register, and enables the merchant to edit a merchant profile on the commerce server.

26. The commerce server device of claim 19, further comprising:
a third commerce server mechanism enables interaction with the merchant allowing the merchant to purchase advertisement slots for specific advertisements and associated key words.

27. The method of claim 1, wherein the consumer nonprivate statistical advertisement data is selected from the group consisting of a number of times each advertisement for each merchant is seen, a number of times each advertisement in each category is seen, a percentage of the advertisement viewed, a total amount of time spent viewing the advertisement, what time of day the advertisement is viewed, and a number of times the consumer has clicked on the advertisement to obtain further information.

28. The system of claim 10, wherein the consumer nonprivate statistical advertisement data is selected from the group consisting of a number of times each advertisement for each merchant is seen, a number of times each advertisement in each category is seen, a percentage of the advertisement viewed, a total amount of time spent viewing the advertisement, what time of day the advertisement is viewed, and a number of times the consumer has clicked on the advertisement to obtain further information.

29. The consumer device of claim 19, wherein the consumer nonprivate statistical advertisement data is selected from the group consisting of a number of times each advertisement for each merchant is seen, a number of times each advertisement in each category is seen, a percentage of the advertisement viewed, a total amount of time spent viewing the advertisement, what time of day the advertisement is viewed, and a number of times the consumer has clicked on the advertisement to obtain further information.

\* \* \* \* \*